(12) United States Patent
Muramatsu

(10) Patent No.: US 7,375,990 B2
(45) Date of Patent: May 20, 2008

(54) SWITCHING POWER DEVICE

(75) Inventor: Akira Muramatsu, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 0 days.

(21) Appl. No.: 11/453,299

(22) Filed: Jun. 14, 2006

(65) Prior Publication Data
US 2007/0002592 A1 Jan. 4, 2007

(30) Foreign Application Priority Data
Jun. 14, 2005 (JP) ............................ P2005-173943

(51) Int. Cl.
*H02H 7/122* (2006.01)
(52) U.S. Cl. .................... 363/56.1; 361/93.1
(58) Field of Classification Search ................ 363/16, 363/21.01, 49, 56.03, 56.07, 56.09, 56.1; 361/16, 79, 93.1, 93.9
See application file for complete search history.

(56) References Cited

U.S. PATENT DOCUMENTS

| 4,141,613 | A | * | 2/1979 | Mori et al. .................... 322/28 |
| 6,738,247 | B2 | * | 5/2004 | Uchida ....................... 361/93.1 |
| 6,813,170 | B2 | * | 11/2004 | Yang ........................ 363/56.09 |
| 6,980,443 | B2 | * | 12/2005 | Nagano et al. ............. 363/56.1 |

FOREIGN PATENT DOCUMENTS

| JP | 4-251520 | 9/1992 |
| JP | 5-30735 | 2/1993 |
| JP | 6-327241 | 11/1994 |

OTHER PUBLICATIONS

Patent Abstracts of Japan, Publication No. 04-251520, Publication Date: Sep. 7, 1992, 1 page.
Patent Abstracts of Japan, Publicaiton No. 06-327241, Publication Date: Nov. 25, 1994, 2 pages.

* cited by examiner

*Primary Examiner*—Jessica Han
(74) *Attorney, Agent, or Firm*—Osha Liang LLP

(57) ABSTRACT

Electric current supplied to the primary side winding of a switching transformer is switched to generate ac power respectively in a plurality of secondary side windings of the switching transformer. A switching control signal is optically transmitted depending on the voltage of dc power obtained by rectifying and smoothing the ac power generated in the secondary side windings of the switching transformer and whether or not the output side of an electronic circuit connected to the secondary side windings of the switching transformer is short-circuited. When the short-circuit of the output side of the electronic circuit is detected, a switching operation is stopped in accordance with the transmitted switching control signal.

8 Claims, 2 Drawing Sheets

SWITCHING POWER DEVICE

BACKGROUND

1. Technical Field

The present invention relates to a switching power device supplying dc power to an electronic device and, more particularly to a switching power device that can prevent the heat generation and burning of an electronic circuit due to a short-circuit current when the output side of the electronic circuit connected to the switching power device is short-circuited.

2. Description of Related Art

Generally, as power devices of television receivers, video devices, disk devices or the like, many switching power devices are employed. In each of the switching power devices, when the output side of the switching power device is short-circuited owing to any cause, the fall of the output voltage of the switching device is detected to operate a latch circuit and the switching operation of the switching power device is stopped to prevent the switching power device from generating heat and being burnt owing to a short-circuit current. However, when the output side of an electronic circuit such as a three-terminal regulator connected to the output side of the switching power device is short-circuited, the latch circuit does not operate, so that the switching operation of the switching power device is not stopped. Thus, the electronic circuit connected to the output side of the switching power device undesirably generates heat and is burnt due to the short-circuit current.

It is known that when the output side of a switching power circuit is short-circuited, an abnormal fall of a cathode voltage of a rectifying diode in each output side of a secondary side winding of a switching transformer of the switching power circuit is detected to stop the supply of electric current to a primary side winding of the switching transformer of the switching power circuit (for instance, see JP-A-4-251520).

Further, a technique is known that when the output side of a switching power circuit is short-circuited, a voltage abnormality detecting diode connected to the output side of a secondary side winding of a switching transformer is electrically conducted to detect the short-circuit of the output side of the switching power circuit, and output voltage to a primary side winding of the switching transformer of the switching power circuit is suppressed to lower the output voltage of the secondary side winding of the switching transformer (for instance, see JP-A-6-327241).

SUMMARY

According to JP-A-4-251520, when the output side of a switching power circuit is short-circuited, an abnormal fall of a cathode voltage of a rectifying diode in each output side of a secondary side winding of a switching transformer of the switching power circuit can be detected to stop the supply of electric current to a primary side winding of the switching transformer of the switching power circuit. When the output side of the switching power device is short-circuited, the output of the switching power circuit is stopped. When the output side of the electronic circuit connected to the output side of the switching power device is short-circuited, the output of the switching power device is not adapted to be stopped so as to prevent the electronic circuit from generating heat or being burnt.

Further, when the output side of the switching power circuit is short-circuited, the voltage abnormality detecting diode connected to the output side of the secondary side winding of the switching transformer can be electrically conducted to detect the short-circuit of the output side of the switching power circuit, and the output voltage to the primary side winding of the switching transformer of the switching power circuit can be suppressed to lower the output voltage of the secondary side winding of the switching transformer. When the output side of the switching power device is short-circuited, the output of the switching power circuit is stopped. When the output side of the electronic circuit connected to the output side of the switching power device is short-circuited, the output of the switching power device is not adapted to be stopped so as to prevent the electronic circuit from generating heat or being burnt.

The present invention has been made in view of the above circumstances and provides a switching power device. When the output side of an electronic circuit connected to the output side of the switching power device is short-circuited, the switching operation of the switching power device can be stopped to prevent the heat generation and burning of the electronic circuit due to a short-circuit current.

According to an aspect of the invention, there is provided a switching power device that switches electric current supplied to a primary side winding of a switching transformer to rectify and smooth AC power generated respectively in a plurality of secondary side windings of the switching transformer and supply DC power. The switching power device includes; a switching unit, a short-circuit detecting unit, a voltage detecting unit, a feedback unit, and a stopping unit. The switching unit switches the electric current supplied to the primary side winding of the switching transformer to generate the ac power respectively in the plurality of secondary side windings of the switching transformer. The short-circuit detecting unit detects the short-circuit of an output side of an electronic circuit connected to the secondary side windings of the switching transformer. The voltage detecting unit outputs a switching control signal in accordance with the voltage of the dc power obtained by rectifying and smoothing the ac power generated in the secondary side windings of the switching transformer and a signal from the short-circuit detecting unit. The feedback unit optically transmits the switching control signal from the voltage detecting unit to the switching unit. The stopping unit stops the switching operation of the switching unit in accordance with the switching control signal from the voltage detecting unit when the short-circuit of the output side of the electronic circuit is detected by the short-circuit detecting unit.

According to the above-aspect, the short-circuit detecting unit may serve to detect the short-circuit of the output side of the electronic circuit depending on whether or not a plurality of diodes connected in series are electrically conducted.

According to the above-aspects, the stopping unit may serve to hold the stopping state of the switching operation of the switching unit when the switching operation of the switching unit is stopped.

When the output side of the electronic circuit connected to the output side of the switching power device is short-circuited, the switching operation of the switching power device can be stopped to prevent the electronic circuit from generating heat and being burnt due to a short-circuit current by these units.

According to the above-aspects, the electric current supplied to the primary side winding of the switching transformer is switched to generate the ac power respectively in the plurality of secondary side windings of the switching transformer. The switching control signal is optically transmitted depending on the voltage of the dc power obtained by rectifying and smoothing the ac power generated in the secondary side windings of the switching transformer and whether or not the output side of the electronic circuit connected to the secondary side windings of the switching transformer is short-circuited in accordance with the presence or absence of the electric conduction of the plurality of diodes connected in series. When the short-circuit of the output side of the electronic circuit is detected, the switching operation is stopped in accordance with the transmitted switching control signal and the stopping state of the switching operation is held. Accordingly, when the output side of the electronic circuit connected to the output side of the switching power device is short-circuited, the switching operation of the switching power device can be stopped to prevent the heat generation and burning of the electronic circuit due to a short-circuit current.

According to the above-aspects, the electric current supplied to the primary side winding of the switching transformer is switched to generate the ac power respectively in the plurality of secondary side windings of the switching transformer. The switching control signal is optically transmitted depending on the voltage of the dc power obtained by rectifying and smoothing the ac power generated in the secondary side windings of the switching transformer and whether or not the output side of the electronic circuit connected to the secondary side windings of the switching transformer is short-circuited. When the short-circuit of the output side of the electronic circuit is detected, the switching operation is stopped in accordance with the transmitted switching control signal. Accordingly, when the output side of the electronic circuit connected to the output side of the switching power device is short-circuited, the switching operation of the switching power device can be stopped to prevent the heat generation and burning of the electronic circuit due to a short-circuit current.

According to the above-aspects, since the short-circuit of the output side of the electronic circuit can be detected depending on whether or not the plurality of diodes connected in series are electrically conducted, the short-circuit of the output side of the electronic circuit connected to the output side of the switching power device can be detected by a simple circuit structure to stop the switching operation of the switching power device and prevent the heat generation and burning of the electronic circuit due to a short-circuit current.

According to the above-aspects, when the switching operation is stopped, the stopping state of the switching operation is held. Accordingly, when the short-circuit of the output side of the electronic circuit connected to the output side of the switching power device is detected, the stopping state of the switching operation of the switching power device can be held to prevent the heat generation and burning of the electronic circuit due to a short-circuit current.

BRIEF DESCRIPTION OF THE DRAWINGS

These and other objects and advantages of this invention will become more fully apparent from the following detailed description taken with the accompanying drawings in which.

DESCRIPTION OF EMBODIMENTS

Figure 1:
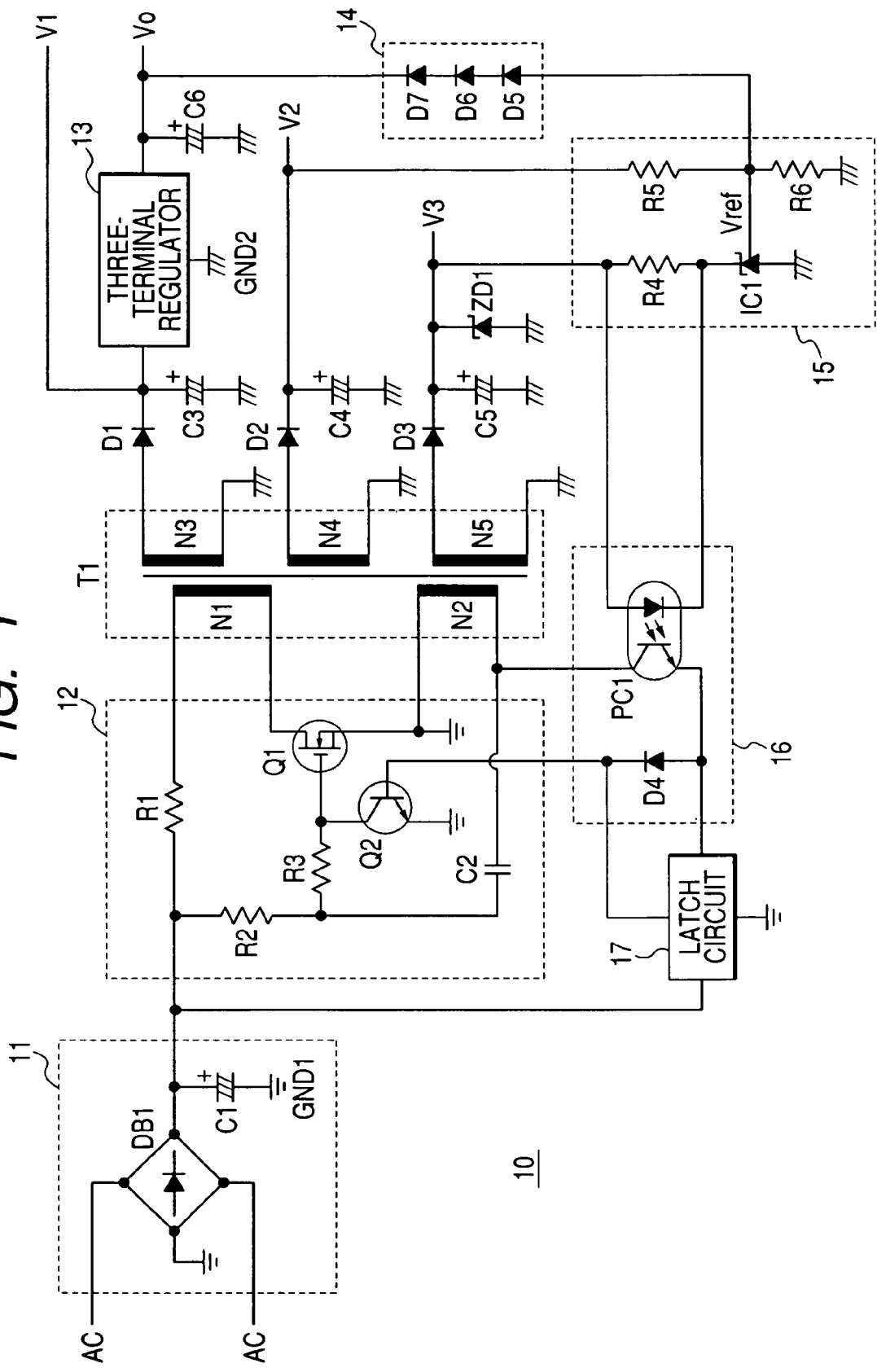
FIG. 1 is a circuit diagram of a switching power device of an embodiment of the present invention.
Figure 2:
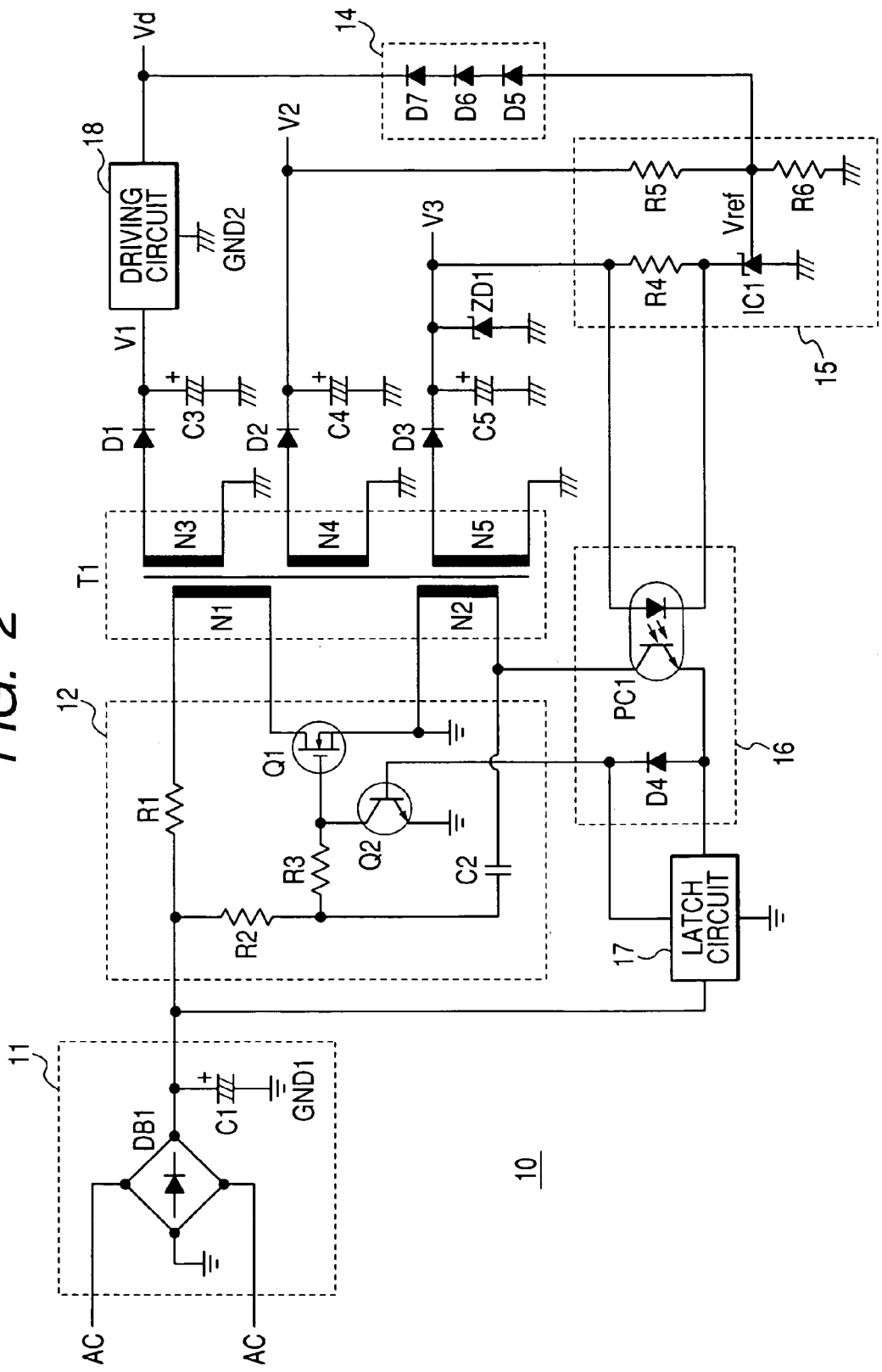
FIG. 2 is a circuit diagram of a switching power device of another embodiment of the present invention.

Now, best modes for carrying out the present invention will be described below in detail by suitably referring to the drawings. FIG. 1 is a circuit diagram of a switching power device of an embodiment of the present invention. FIG. 2 is a circuit diagram of a switching power device of another embodiment of the present invention.

Initially, the switching power device of the embodiment will be described with reference to the circuit diagram thereof.

The switching power device 10 includes a rectifying and smoothing circuit 11 having a diode bridge DB1 for rectifying, smoothing and converting ac power supplied from an ac power source AC to dc power and a condenser C1; a self-oscillation type switching circuit 12 having a switching transistor Q1, a transistor Q2, resistances R1, R2 and R3 and a condenser C2 that supply the dc power rectified and smoothed by the rectifying and smoothing circuit 11 to a primary side winding N1 of a switching transformer T1 to switch electric current supplied to the primary side winding N1 of the switching transformer T1, and turn ON/OFF a switching operation in accordance with voltage generated in a control winding N2 to generate the ac power respectively in a plurality of secondary side windings N3, N4 and N5 of the switching transformer T1; a three-terminal regulator 13 for stabilizing the dc power of voltage V1 obtained by rectifying and smoothing the ac power generated in the secondary side winding N3 of the switching transformer T1 by a rectifying diode D1 and a condenser C3 to the dc power of voltage Vo and outputting the dc power to a load (not shown in the drawing) connected to a condenser C6; a short-circuit detecting circuit 14 for detecting the short-circuit of the output side of the three-terminal regulator 13 depending on whether or not short-circuit detecting diodes D5, D6 and D7 are electrically conducted, a voltage detecting circuit 15 having a shunt regulator IC1 and resistances R4, R5 and R6 for rectifying and smoothing the ac power generated in the secondary side winding N5 of the switching transformer T1 by a rectifying diode D3 and a condenser C5 to supply the dc power of voltage V3 applied to a Zener diode ZD1 through the resistance R4 and outputting a switching control signal in accordance with voltage Vref obtained by dividing the voltage V2 of the dc power got by rectifying and smoothing the ac power generated in the secondary side winding N4 of the switching transformer T1 by a rectifying diode D2 and a condenser C4 by resistances R5 and R6 and a signal from the short-circuit detecting circuit 14; a feedback circuit 16 having a photo-coupler PC1 and a diode D4 for respectively electrically insulating the primary side winding N1, the control winding N2 and the plurality of secondary side windings N3, N4 and N5 of the switching transformer T1 and optically transmitting the switching control signal from the voltage detecting circuit 15 to the switching circuit 12; and a latch circuit 17 for outputting a control signal to the switching circuit 12 when the short-circuit of the output side of the three-terminal regulator 13 is detected by the short-circuit detecting circuit 14 to stop the switching operation of the switching circuit 12 and hold the stopping state of the switching operation of the switching circuit 12. GND1 designates a primary side ground of the switching transformer T1. GND2 designated designates a secondary side ground of the switching transformer T1. The GND1 and the GND2 are respectively electrically insulated from the primary side winding N1, the control winding N2 and the secondary side windings N3, N4 and N5.

Now, an operation of the switching power device constructed as described above will be described below.

When the ac power is supplied to the switching power device 10 from the ac power source AC and rectified and smoothed to the dc power by the rectifying and smoothing circuit 11 and the voltage of a positive polarity is applied to the gate of the switching transistor Q1 through the resistances R2 and R3 of the switching circuit 12, the switching transistor Q1 is turned ON to supply the electric current to the primary side winding N1 of the switching transformer T1 and supply the electric current respectively to the secondary side windings N3, N4 and N5 of the switching transformer T1. When the electric current is supplied to the primary side winding N1 of the switching transformer T1, the voltage of a negative polarity is generated in the control winding N2 of the switching transformer T1 and applied to the gate of the switching transistor Q1 through the condenser C2 to turn OFF the switching transistor Q1. When the switching transistor Q1 is turned OFF, since the voltage of the positive polarity is applied to the gate of the switching transistor Q1 through the resistances R2 and R3, the switching transistor Q1 is turned ON again. The switching transistor Q1 repeats ON/OFF operations to continuously carry out the switching operation of the switching circuit 12 and generate the ac power respectively in the secondary side windings N3, N4 and N5 of the switching transformer T1. When the ac power is generated in the secondary side windings N3, N4 and N5 of the switching transformer T1 by the switching operation of the switching transistor Q1 of the switching circuit 12, the ac power generated in the secondary side windings N3, N4 and N5 of the switching transformer T1 is respectively rectified and smoothed by the rectifying diode D1, the condenser C3, the rectifying diode D2, the condenser C4, the rectifying diode D3 and the condenser C5 to output the dc power of the voltage V1, V2 and V3.

When the voltage V2 of the dc power obtained by rectifying and smoothing the ac power generated in the secondary side winding N4 of the switching transformer T1 is higher than a prescribed voltage and the voltage Vref applied to the shunt regulator IC1 of the voltage detecting circuit 15 becomes high, the cathode current of the shunt regulator IC1 of the voltage detecting circuit 15 increases, and the anode current of a light emitting diode of the photo-coupler PC1 of the feedback circuit 16 increases to increase the light emitting strength of the light emitting diode of the photo-coupler PC1. Thus, the collector current of a photo-transistor of the photo-coupler PC1 increases to increase base current supplied to the base of the transistor Q2 of the switching circuit 12 through the diode D4 and increase the collector current of the transistor Q2. Thus, the gate voltage of the switching transistor Q1 of the switching circuit 12 is lowered to decrease the drain current of the switching transistor Q1 and decrease the electric current supplied to the primary side winding N1 of the switching transformer T1. Consequently, the voltage of the ac power generated in the secondary side windings N3, N4 and N5 of the switching transformer T1 is controlled to become the prescribed voltage.

Further, when the voltage V2 of the dc power obtained by rectifying and smoothing the ac power generated in the secondary side winding N4 of the switching transformer T1 is lower than a prescribed voltage and the voltage Vref applied to the shunt regulator IC1 of the voltage detecting circuit 15 becomes low, the cathode current of the shunt regulator IC1 of the voltage detecting circuit 15 decreases, and the anode current of the light emitting diode of the photo-coupler PC1 of the feedback circuit 16 decreases to weaken the light emitting strength of the light emitting diode of the photo-coupler PC1. Thus, the collector current of the photo-transistor of the photo-coupler PC1 decreases to decrease the base current supplied to the base of the transistor Q2 of the switching circuit 12 through the diode D4 and decrease the collector current of the transistor Q2. Thus, the gate voltage of the switching transistor Q1 of the switching circuit 12 is raised to increase the drain current of the switching transistor Q1 and increase the electric current supplied to the primary side winding N1 of the switching transformer T1. Consequently, the voltage of the ac power generated in the secondary side windings N3, N4 and N5 of the switching transformer T1 is controlled to become the prescribed voltage.

Then, when the condenser C6 connected to the output side of the three-terminal regulator 13 is short-circuited due to any cause, the terminal voltage Vo of the condenser C6 becomes 0V. When the terminal voltage Vo of the condenser C6 becomes 0V, the short-circuit detecting diodes D5, D6 and D7 of the short-circuit detecting circuit 14 which are not ordinarily electrically conducted are electrically conducted so that the voltage Vref applied to the shunt regulator IC1 of the voltage detecting circuit 15 is abnormally lowered to the forward voltage of the short-circuit detecting diodes D5, D6 and D7. When the voltage Vref applied to the shunt regulator IC1 of the voltage detecting circuit 15 is abnormally lowered, the cathode current of the shunt regulator IC1 of the voltage detecting circuit 15 decreases, and the anode current of the light emitting diode of the photo-coupler PC1 of the feedback circuit 16 decreases to weaken the light emitting strength of the light emitting diode of the photo-coupler PC1. Thus, the collector current of the photo-transistor of the photo-coupler PC1 decreases to decrease the base current supplied to the base of the transistor Q2 of the switching circuit 12 through the diode D4 and decrease the collector current of the transistor Q2. Thus, the gate voltage of the switching transistor Q1 of the switching circuit 12 is raised to increase the drain current of the switching transistor Q1 and increase the electric current supplied to the primary side winding N1 of the switching transformer T1. Accordingly, the voltage V3 of the ac power generated in the secondary side winding N5 of the switching transformer T1 is raised and exceeds the Zener voltage of the Zener diode ZD1, so that the Zener diode ZD1 is broken down. When the Zener diode ZD1 is broken down, the anode current of the light emitting diode of the photo-coupler PC1 of the feedback circuit 16 abnormally decreases to weaken the light emitting strength of the light emitting diode of the photo-coupler PC1. Thus, the collector current of the photo-transistor of the feedback circuit 16 abnormally decreases and the latch circuit 17 operates to stop the switching operation of the switching circuit 12 and stop an output from the switching power device 10. Thus, even when the output side of the three-terminal regulator 13 connected to the output side of the switching power device 10 is short-circuited, the latch circuit 17 for preventing the heat generation and burning of the switching power device 10 during the short-circuit of the output side of the switching power device 10 can be operated to prevent the three-terminal regulator 13 connected to the output side of the switching power device 10 from generating heat and being burnt. While the ac power from the ac power source AC is supplied to the switching power device, the operation of the latch circuit 17 is continuously carried out so that the stopping state of the switching operation of the switching circuit 12 can be held.

A switching power device of another embodiment of the present invention will be described below by referring to a circuit diagram shown in FIG. 2

In FIG. 2, the same components as those of FIG. 1 are designated by the same reference numerals and an explanation thereof will be omitted. The switching power device 10 shown in FIG. 2 is different from that of FIG. 1 in a point that a driving circuit 18 is provided in place of the three-terminal regulator 13 of the switching power device shown in FIG. 1. Further, since the operation of the switching power device shown in FIG. 2 is the same as that described in FIG. 1, a duplicated explanation is omitted. When the output side of the driving circuit 18 connected to the output side of the switching power device 10 is short-circuited due to any cause, output voltage Vd for driving a load of the driving circuit 18 is abnormally lowered. When the output side of the driving circuit 18 connected to the output side of the switching power device 10 is short-circuited, since the short-circuit detecting diodes D5, D6 and D7 of a short-circuit detecting circuit 14 are electrically conducted and voltage Vref applied to a shunt regulator IC1 of a voltage detecting circuit 15 is abnormally lowered, a latch circuit 17 operates as described above to stop the switching operation of a switching circuit 12 and stop an output from the switching power device 10. Thus, even when the output side of the driving circuit 18 connected to the output side of the switching power device 10 is short-circuited, the latch circuit 17 for preventing the heat generation and burning of the switching power device 10 during the short-circuit of the output side of the switching power device 10 can be operated to prevent the driving circuit 18 connected to the output side of the switching power device 10 from generating heat and being burnt.

The best modes for carrying out the present invention are described above in detail, however, it is to be understood that the present invention is not limited thereto and modifications or improvements thereof may be made within an ordinary knowledge of a person with ordinary skill in the art. For instance, in the above-described embodiments, the short-circuit of the output side of the electronic circuit connected to the output side of the switching power device is detected depending on whether or not the three short-circuit detecting diodes are electrically conducted. However, the short-circuit of the output side of the electronic circuit connected to the output side of the switching power device may be detected depending on whether or not the Zener diode is electrically conducted.

What is claimed is:

1. A switching power device switching electric current supplied to a primary side winding of a switching transformer to rectify and smooth AC power generated respectively in first, second, and third secondary side windings of the switching transformer and supply DC power, comprising:

a self-oscillation type switching unit having a first switching device and a second switching device, wherein the second switching device variably controls an applied voltage to a control terminal of the first switching device, and switching the electric current supplied to the primary side winding of the switching transformer to generate the AC power respectively in the first, second, and third secondary side windings of the switching transformer;

a short-circuit detecting unit detecting a short-circuit of an output side of an electronic circuit connected to the first secondary side winding of the switching transformer depending on whether or not a plurality of diodes connected in series are electrically conducted;

a voltage detecting unit outputting a switching control signal in accordance with the voltage of the DC power obtained by rectifying and smoothing the AC power generated in the second and third secondary side windings of the switching transformer and a signal from the short-circuit detecting unit;

a feedback unit optically transmitting the switching control signal from the voltage detecting unit to a control terminal of the second switching device of the switching unit; and a stopping unit stopping the switching operation of the switching unit in accordance with the switching control signal from the voltage detecting unit when the short-circuit of the output side of the electronic circuit is detected by the short-circuit detecting unit and, holding a stopping state of the switching operation of the switching unit;

wherein a condenser is connected to the output side of the electronic circuit; and wherein a constant-voltage device is connected between the third secondary side winding and the voltage detecting unit.

2. The switching power device according to claim 1, wherein the electronic circuit comprises a three-terminal regulator.

3. The switching power device according to claim 1, wherein the electronic circuit comprises a driving circuit.

4. A switching power device switching electric current supplied to a primary side winding of a switching transformer to rectify and smooth AC power generated respectively in first, second, and third secondary side windings of the switching transformer and supply DC power, comprising:

a self-oscillation type switching unit having a first transistor and a second transistor, wherein the second transistor variably controls an applied voltage to a control terminal of the first transistor, and switching the electric current supplied to the primary side winding of the switching transformer to generate the AC power respectively in the first, second, and third secondary side windings of the switching transformer;

a short-circuit detecting unit detecting a short-circuit of an output side of an electronic circuit connected to the first secondary side windings of the switching transformer;

a voltage detecting unit outputting a switching control signal in accordance with the voltage of the DC power obtained by rectifying and smoothing the AC power generated in the second and third secondary side windings of the switching transformer and a signal from the short-circuit detecting unit;

a feedback unit optically transmitting the switching control signal from the voltage detecting unit to a control terminal of the second transistor of the switching unit; and a stopping unit stopping the switching operation of the switching unit in accordance with the switching control signal from the voltage detecting unit when the short-circuit of the output side of the electronic circuit is detected by the short-circuit detecting unit;

wherein a condenser is connected to the output side of the electronic circuit; and wherein a constant-voltage device is connected between the third secondary side winding and the voltage detecting unit.

5. The switching power device according to claim 4, wherein the short-circuit detecting unit serves to detect the short-circuit of the output side of the electronic circuit depending on whether or not a plurality of diodes connected in series are electrically conducted.

6. The switching power device according to claim 4, wherein the stopping unit serves to hold the stopping state of the switching operation of the switching unit when the switching operation of the switching unit is stopped.

7. The switching power device according to claim 4, wherein the electronic circuit comprises three-terminal regulator.

8. The switching power device according to claim 4, wherein the electronic circuit comprises a driving circuit.

* * * * *